(12) United States Patent
Ratcliff, III

(10) Patent No.: US 7,392,287 B2
(45) Date of Patent: Jun. 24, 2008

(54) METHOD AND APPARATUS FOR SHARING INFORMATION USING A HANDHELD DEVICE

(75) Inventor: Raymond F. Ratcliff, III, Plano, TX (US)

(73) Assignee: Hemisphere II Investment LP, Palm Beach, FL (US)

( * ) Notice: Subject to any disclaimer, the term of this patent is extended or adjusted under 35 U.S.C. 154(b) by 1451 days.

(21) Appl. No.: 09/818,003

(22) Filed: Mar. 27, 2001

(65) Prior Publication Data

US 2002/0143875 A1      Oct. 3, 2002

(51) Int. Cl.
    *G06F 15/16* (2006.01)
(52) U.S. Cl. .................. 709/205; 709/217; 250/236
(58) Field of Classification Search ............ 709/205, 709/217; 370/389; 250/236
    See application file for complete search history.

(56) References Cited

U.S. PATENT DOCUMENTS

| | | | |
|---|---|---|---|
| 5,655,081 A | 8/1997 | Bonnell et al. | |
| 5,680,548 A | 10/1997 | Trugman | |
| 5,740,549 A | 4/1998 | Reilly et al. | |
| 5,978,594 A | 11/1999 | Bonnell et al. | |
| 5,978,829 A | 11/1999 | Chung et al. | |
| 6,032,137 A | 2/2000 | Ballard | 705/75 |
| 6,041,398 A | 3/2000 | Pechanek | |
| 6,112,225 A | 8/2000 | Kraft et al. | |
| 6,167,428 A | 12/2000 | Ellis | |
| 6,167,462 A | 12/2000 | Davis et al. | 710/5 |
| 6,229,139 B1 * | 5/2001 | Neukermans et al. | 250/236 |
| 6,510,509 B1 | 1/2003 | Chopra | |
| 6,515,988 B1 * | 2/2003 | Eldridge et al. | 370/389 |
| 6,707,581 B1 * | 3/2004 | Browning | 358/473 |
| 6,725,250 B1 | 4/2004 | Ellis et al. | |
| 6,732,141 B2 | 5/2004 | Ellis | |
| 6,765,559 B2 * | 7/2004 | Hayakawa | 345/173 |
| 6,771,568 B2 * | 8/2004 | Hochendoner | 369/30.06 |
| 2001/0039497 A1 | 11/2001 | Hubbard | |
| 2002/0013832 A1 | 1/2002 | Hubbard | |
| 2002/0019844 A1 | 2/2002 | Kurowski | |
| 2002/0111210 A1 | 8/2002 | Luciano | |
| 2003/0055679 A1 | 3/2003 | Soll | |
| 2003/0157976 A1 | 8/2003 | Simon | |

* cited by examiner

*Primary Examiner*—Bunjob Jaroenchonwanit
*Assistant Examiner*—Kyung H Shin
(74) *Attorney, Agent, or Firm*—DLA Piper US LLP

(57) ABSTRACT

A method and apparatus for sending information to a data processing apparatus for identifying a document to share with a recipient. A handheld device is capable of communicating with the data processing apparatus. Information is captured from the document and stored in the handheld device as document data. A communications path is established between the handheld device and the data processing apparatus. The document data is sent to the data processing apparatus through the communications path. Reference documents are provided. Each reference document has reference data stored in a memory. At least a portion of the received document data is extracted as scanning data. The reference data is retrieved from the memory. The scanning data is compared with the reference data. When the scanning data matches at least a portion of the reference data of one of the reference documents, the one reference document is selected as the identified document for forwarding to the recipient.

36 Claims, 3 Drawing Sheets

METHOD AND APPARATUS FOR SHARING INFORMATION USING A HANDHELD DEVICE

FIELD

The present invention relates generally to sharing information and, more particularly, to identifying a document from information input to a handheld device and forwarding the document to a designated recipient.

BACKGROUND

Sharing information from documents is generally a manual and time-consuming process. When an individual reads a newspaper or magazine article and wishes to share the article with someone, he must endure a multi-stepped process fraught with frustration and potential for mistake.

A number of conventional means for sharing documents are available, although none are particularly palatable. In the above example, to share the newspaper or magazine article, the individual would have to choose one of the following means: physically tear out or photocopy the article and mail it, photocopy the article and fax it, read the article over the phone, scan the article into a computer and send it electronically, or visit the website for the newspaper or magazine, find the article, then send the uniform resource locator ("URL") for the website to the desired recipient.

The tasks above are needlessly time consuming and problematic. In the time required to manipulate the physical document and arrange for sending, the recipient could have already read the article and discussed it with the sender, if only the recipient had received the article sooner. Moreover, with all of the effort required on the part of the sender to coordinate sending the document, there is a strong likelihood the sender may lose interest altogether and not even attempt to send the article.

SUMMARY

One aspect of the present invention relates to sending information to a data processing apparatus for identification of a document having the information. A handheld device having a memory is capable of communicating with the data processing apparatus. Information is captured from the document. The captured information is stored in the memory of the handheld device as document data. A communications path is established between the handheld device and the data processing apparatus. The document data is retrieved from the memory of the handheld device and sent to the data processing apparatus through the communications path for identification of the document.

Another aspect of the present invention relates to identifying the document for sharing with a recipient, in the data processing apparatus. Reference documents are provided. Each reference document has reference data stored in a memory. The document data received from the handheld device is associated with one of the reference documents. At least a portion of the received document data is extracted as scanning data. The reference data is retrieved from the memory. The scanning data is compared with the reference data. When the scanning data matches at least a portion of the reference data of one of the reference documents, the one reference document is selected as the identified document.

BRIEF DESCRIPTION OF THE FIGURES

The invention may be better understood with reference to the following figures. The components in the figures are not necessarily to scale, emphasis instead being placed upon clear illustration of principles.

DETAILED DESCRIPTION

Figure 1:
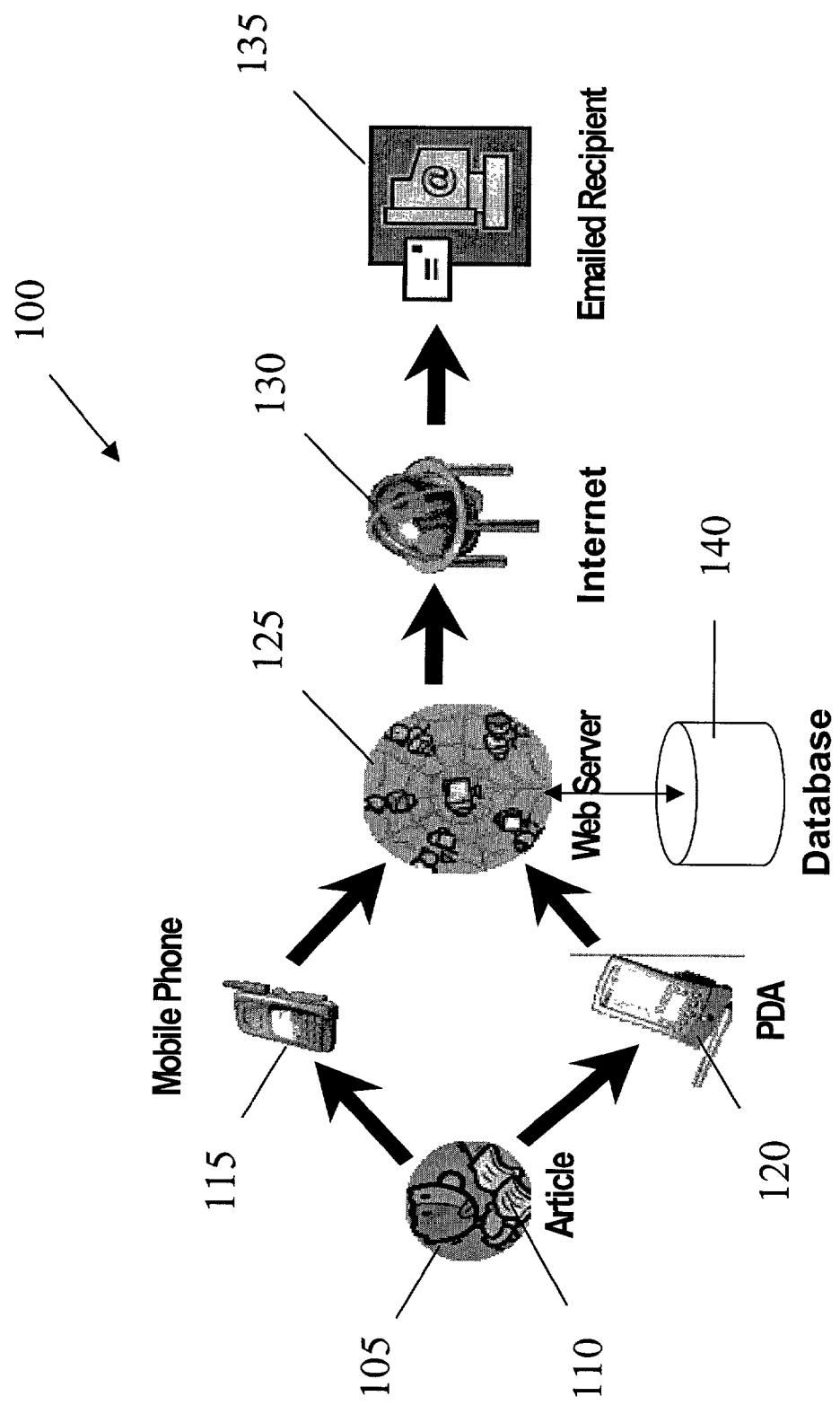
FIG. 1 is a block diagram of a system 100 for identifying a document and forwarding the document to a designated recipient, constructed according to an exemplary embodiment of the present invention.

FIG. 1 is a block diagram of a system 100 for identifying a document and forwarding the document to a designated recipient, constructed according to an exemplary embodiment of the present invention. In FIG. 1, a user 105, also referred to herein as a sender, locates a data source such as document 110. In some examples, the document 110 is a physical document such as an article in a periodical like a newspaper or magazine. In other examples, the document 110 is in electronic form, such as a word processing document or HTML document displayed on a handheld device or other data processing apparatus. Upon reading the document 110, the user 105 realizes he has several associates or desired recipients who, he believes, would also be interested in reading the document 110.

In FIG. 1, the user 105 operates a handheld device such as a mobile phone 115 or personal digital assistant ("PDA") 120. Other exemplary handheld devices include the following sold under their respective trademarks: Handspring VISOR™, Palm PALM™, HP JORNADA™, Compaq IPAQ™, Research In Motion BLACKBERRY™, NEOPOINT® Smart Phone, PSION® Series 7, NOKIA® Communicator 9000il, Samsung SCH-3500 Smart Phone, and SPRINT PCS TOUCHPOINT™. Other suitable handheld devices include watches and combinations of the above handheld devices. Such watches and devices include Qbe Personal Computing Tablet, QUBIT™ Tablet, Intel Tablet, ONHAND™ PC, daVinci, Franklin REX, Sharp ZAURUS®, Motorola PAGEWRITER® 2000x, and Sharp telMail TM-20.

In FIG. 1, each of the handheld devices 115 and 120 includes a memory for storing data, such as a memory 310 described below with reference to FIG. 3. The various handheld devices operated by user 105 are capable of communicating with a data processing apparatus such as a server 125. A communications path can be established between the handheld devices and the server 125 by conventional techniques, including cellular and other wireless means.

In some exemplary embodiments, part or all of server 125 is implemented as the data processing apparatus 300 described with reference to FIG. 3. World Wide Web ("Web") servers may be readily incorporated. The server 125 is coupled to and in communication with a data network 130 such as the Internet, using conventional techniques understood by those skilled in the art. The server 125 is in communication with a storage means 140 such as a database or other suitable repository. In one example, server 125 is directly coupled to repository 140. In another example, server 125 communicates with repository 140 via data network 130. Reference data is stored in storage means 140 for use by server 125, as explained in greater detail below.

In FIG. 1, one example of data network 130 is the Internet. In other examples, data network 130 is any network with sufficient bandwidth to transmit data signals received from handheld devices such as mobile phone 115 and PDA 120.

Suitable networks include frame relay (FR) networks, ATM networks, wide area networks (WAN), and local area networks (LAN). Other suitable networks 130 include satellite transmission, radio broadcasting, cable television broadcasting, direct line-of-site transmission, telecom fiber optic transmission, cellular transmission, and wireless transmission, as will be understood by the skilled artisan.

In FIG. 1, a recipient 135 is also capable of communicating with data network 130 by conventional means. For example, recipient 135 may be or include a data processing apparatus or computer system such as a laptop computer, handheld device, cellular phone with data network capabilities, and other devices capable of receiving data signals such as e-mail messages from data network 130.

Figure 2:
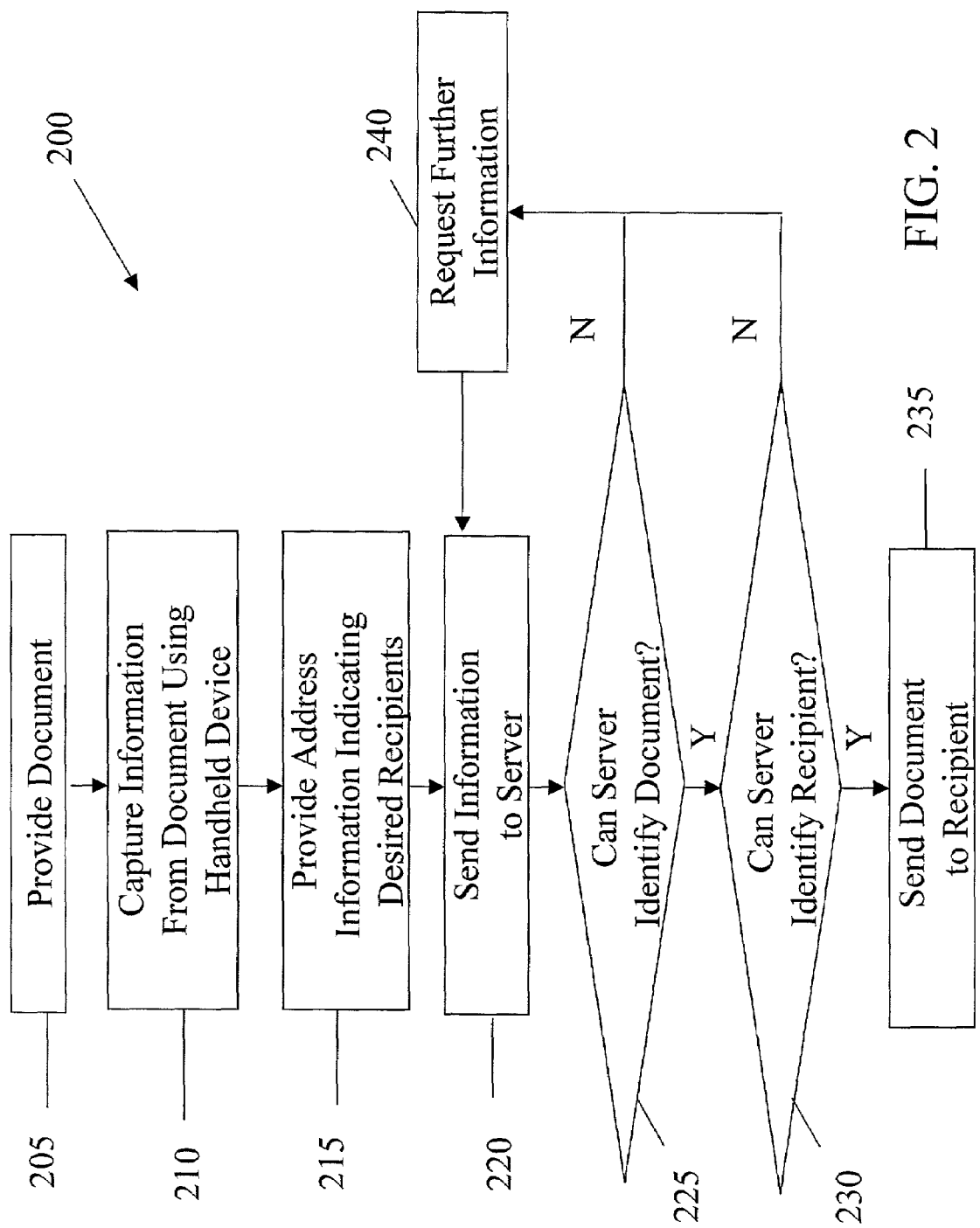
FIG. 2 is a flow diagram of a method 200 for identifying a document and forwarding the document to a designated recipient, performed in accordance with an exemplary embodiment of the present invention.

FIG. 2 is a flow diagram of a method 200 for identifying a document and forwarding the document to a designated recipient, performed in accordance with an exemplary embodiment of the present invention. In FIG. 2, the method begins with user 105 identifying document 110 in step 205.

In step 210, the user 105 captures information from the document 110. In some exemplary embodiments, the handheld device includes an input device such as a microphone and is thus capable of receiving audio voice signals. The user 105 can convey information by speaking into the microphone. In an alternative embodiment, the microphone is physically separated from the handheld device, yet coupled to the device so the audio signals can easily pass to the device for storage in memory. In another exemplary embodiment, the handheld device is provided with a scanning mechanism. In one example, the scanning mechanism is provided as a "plug-in" cartridge that interfaces with the handheld device, as with the Handspring VISOR™ PDA. The scanner can be coupled to the handheld device by other means for scanning the information from the document and conveying the information to the handheld device for storage. Conventional scanners may be used, as will be understood by those skilled in the art. Other conventional means for converting printed text from the document to digital data may readily be used.

Various types of information can be captured from the document and stored in the handheld device. Suitable information includes: title of the document 110, author, publication name (e.g., name of newspaper or magazine), and the date of publication for document 110. The captured information can include one or more of these types of information and/or other types of information.

When the information is captured by the scanner or scanning mechanism, the scanned information is converted to digital data using conventional techniques. Also, audio signals received by the microphone are converted to digital data using a digital-to-audio ("D/A") converter or other suitable means. The digital data is then stored in a memory within the handheld device as captured information or document data.

In FIG. 2, the user also provides address information identifying a receiving address for desired recipient 135 in step 215. In one example, an e-mail address for the desired recipient is spoken into the microphone of the handheld device using techniques described above. In another example, the name of the recipient is spoken into the device for a later table lookup operation performed by the server 125. In yet another example, an e-mail address or mailing address is typed into the handheld device by the user using a keypad incorporated for data entry. This address information is stored in the memory of the handheld device.

In FIG. 2, after the document information is captured and the address information received by the handheld device, a communications path is established between the handheld device and the server 125. In some exemplary embodiments, such communications are established via one or more of the many types of data networks 130 described above. In step 220, the captured document information and the address information are retrieved from the memory in the handheld device and sent to the server 125 via the established communications path. The server 125 then receives the captured document information and the address information.

In step 225, the server 125 then extracts at least a portion of the received document data as scanning data. This extraction may be performed using conventional voice recognition programs to extract portions of digital audio signals and convert these to text-based digital data. Suitable voice recognition programs include Dragon NATURALLY SPEAKING®, Lernout & Hauspie L&H VOICE XPRESS™, and Lernout & Hauspie Power Translator Pro. In step 225, the server attempts to identify the source document 110 using the captured information. To this end, server 125 cross-references the extracted portion of the information with reference data associated with a plurality of reference documents stored in repository 140. That is, the data processing apparatus accesses the reference data, and compares the scanning data with the reference data. In an alternative embodiment, this cross-referencing operation is performed by a human who uses the extracted portion of the information to index physical documents to identify one or more documents having information matching the extracted portion of information.

In step 230, the server 125 extracts the address data from the information received from the handheld device. For digital address data representing an e-mail address, phone number, or postal mailing address spoken into the microphone, a conventional voice recognition program is used to convert the voice-based address data to text-based digital data. The server 125 then attempts to identify the recipient using the text-based digital data. In some embodiments, when the address data is spoken or typed exactly, the text-based address data is used directly as the mailing address. In other embodiments, a table lookup operation is performed by server 125 using the text-based address data by cross-referencing a directory or listing of e-mail addresses associated with real names. This listing is maintained in storage medium 140. In an alternative embodiment, this table lookup operation is performed by a human, as will be appreciated by those skilled in the art.

Proceeding to step 240, when the server cannot identify one of the referenced documents in step 225, or server 125 cannot identify recipient 135 from the address information 230, server 125 sends a signal to the handheld device operated by the user, such as an e-mail message passed via data network 130. This signal includes a message requesting further information and/or clarification of the data already submitted. For example, if the system identified two or more documents matching the captured information, the message prompts the user to specify which of the identified documents to send to recipient 135. Alternatively, the user may be prompted to re-enter address information. The method then returns to step 220, when the user sends such information to the server. In steps 225 and/or 230, the server again attempts to identify the document and/or identify the recipient.

In FIG. 2, the loop represented by steps 220, 225, 230, and 240, repeats as necessary until the proper information is gathered by server 125. In step 235, the identified document can then be sent to the person identified in the identification information. Depending on the type of address information input by the user 105, this sending can be performed by attaching an electronic copy of the identified document to an e-mail message and sending the message to a designated e-mail address of the recipient, or sending an electronic copy of the document by facsimile transmission to a designated phone number. Alternatively, a hard copy of the document can be mailed to a residential mailing address for the recipient.

Figure 3:
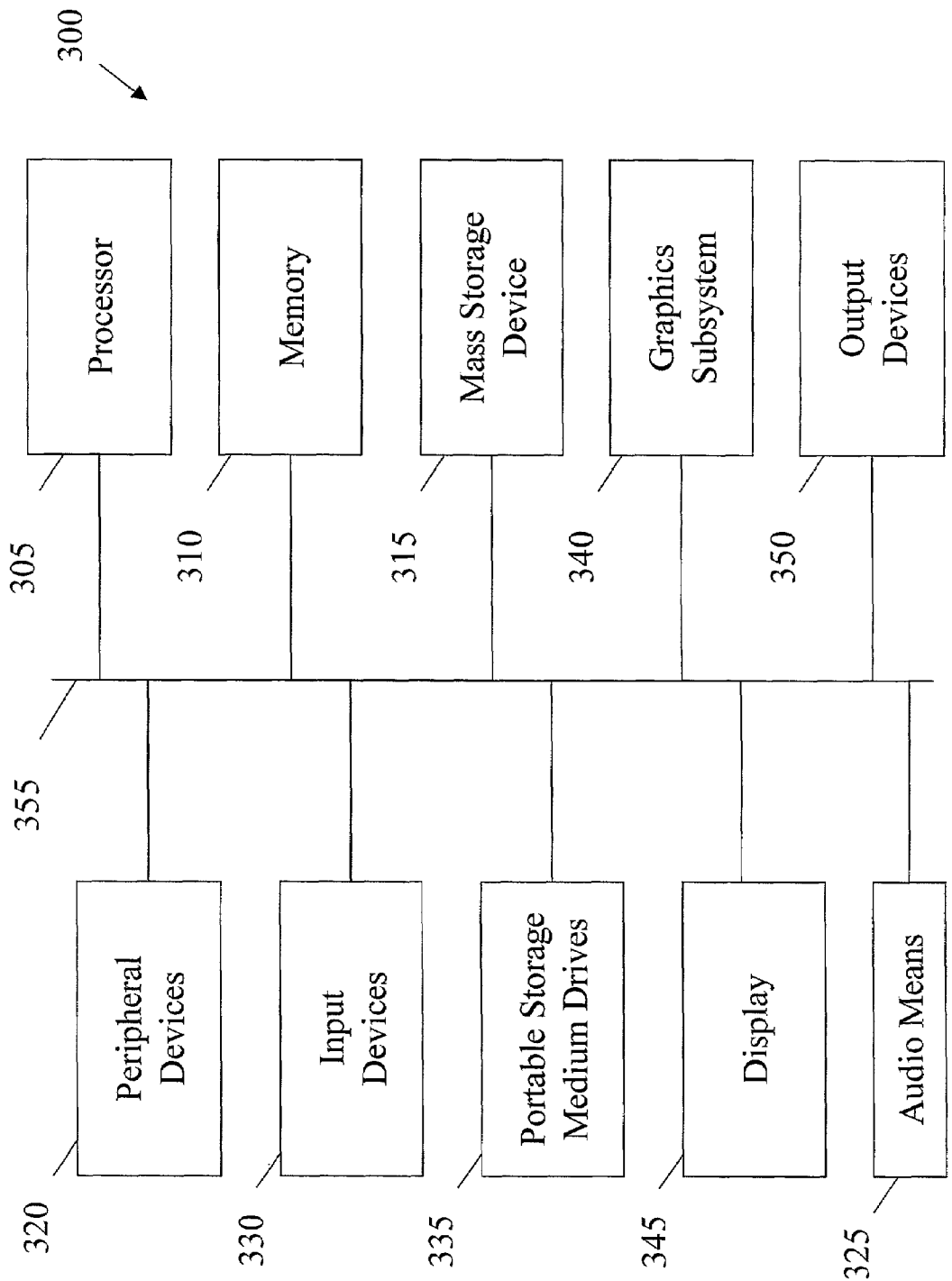
FIG. 3 is a block diagram of a data processing apparatus 300 constructed according to an exemplary embodiment of the present invention.

FIG. 3 is a block diagram of a data processing apparatus 300 that can be incorporated as part of both the handheld device and/or the server 125 in FIG. 1. The data processing apparatus 300 includes a processor 305 for executing program instructions stored in a memory 310. In some embodiments, processor 305 includes a single microprocessor, while in others, processor 305 includes a plurality of microprocessors to define a multi-processor system. The memory 310 stores instructions and data for execution by processor 305, including instructions and data for performing the methods described above. Depending upon the extent of software implementation in data processing apparatus 300, the memory 310 stores executable code when in operation. The memory 310 includes, for example, banks of read-only memory (ROM), dynamic random access memory (DRAM), as well as high-speed cache memory.

In FIG. 3, within data processing apparatus 300, an operating system comprises program instruction sequences that provide a platform for the methods described above. The operating system provides a software platform upon which application programs may execute, in a manner readily understood by those skilled in the art. The data processing apparatus 300 further comprises one or more applications having program instruction sequences for performing the methods described above.

In FIG. 3, the data processing apparatus 300 incorporates any combination of additional devices. These include, but are not limited to, a mass storage device 315, one or more peripheral devices 320, an audio means 325, one or more input devices 330, one or more portable storage medium drives 335, a graphics subsystem 340, a display 345, and one or more output devices 350. The various components are connected via an appropriate bus 355 as known by those skilled in the art. In alternative embodiments, the components are connected through other communications media known in the art. In one example, processor 305 and memory 310 are connected via a local microprocessor bus; while mass storage device 315, peripheral devices 320, portable storage medium drives 335, and graphics subsystem 340 are connected via one or more input/output ("I/O") buses.

In FIG. 3, mass storage device 315 is implemented as fixed and/or removable media, for example, as a magnetic, optical, or magneto-optical disk drive. The drive is preferably a non-volatile storage device for storing data and instructions for use by processor 305. In some embodiments, mass storage device 315 stores client and server information, code for carrying out methods in accordance with exemplary embodiments of the invention, and computer instructions for processor 305. In other embodiments, computer instructions for performing methods in accordance with exemplary embodiments of the invention also are stored in processor 305. The computer instructions are programmed in a suitable language such as Java or C++.

In FIG. 3, the portable storage medium drive 335, in some embodiments, operates in conjunction with a portable non-volatile storage medium, such as a floppy disk, CD-ROM, or other computer-readable medium, to input and output data and code to and from the data processing apparatus 300. In some embodiments, methods performed in accordance with exemplary embodiments of the invention are implemented using computer instructions that are stored on such a portable medium and input to the data processing apparatus 300 via portable storage medium drive 335.

In FIG. 3, the peripheral devices 320 include any type of computer support device, such as an I/O interface, to add functionality to data processing apparatus 300. In one example, the peripheral devices include a network interface card for interfacing the data processing apparatus 300 to a network, a modem, and the like. The peripheral devices also include input devices to provide a portion of a user interface and may include an alphanumeric keypad or a pointing device such as a mouse, a trackball, a stylus, or cursor direction keys. The I/O interface comprises conventional circuitry for controlling input devices and performing particular signal conversions upon I/O data. The I/O interface may include, for example, a keyboard controller, a serial port controller, and/or digital signal processing circuitry.

In FIG. 3, the graphics subsystem 340 and the display 345 provide output alternatives of the system. The graphics subsystem 340 and display 345 include conventional circuitry for operating upon and outputting data to be displayed, where such circuitry preferably includes a graphics processor, a frame buffer, and display driving circuitry. The display 345 may include a cathode ray tube (CRT) display, a liquid crystal display (LCD), or other suitable devices. The display 345 preferably can display at least 256 colors. The graphics subsystem 340 receives textual and graphical information and processes the information for output to the display 345. A video card in the data processing apparatus 300 also comprises a part of graphics subsystem 340 and also preferably supports at least 256 colors. For optimal results in viewing digital images, the user should use a video card and monitor that can display the True Color (24 bit color) setting. This setting enables the user to view digital images with photographic image quality.

In FIG. 3, audio means 325 preferably includes a sound card, on-board sound processing hardware, or a device with built-in processing devices that attach via Universal Serial Bus (USB) or IEEE 1394 (Firewire). The audio means 325 receives audio signals from a peripheral microphone. In addition, audio means 325 may include a processor for processing sound. The signals can be processed by the processor in audio means 325 of data processing apparatus 300 and passed to other devices as, for example, streaming audio signals.

In some embodiments, programs for performing methods in accordance with exemplary embodiments of the invention are embodied as computer program products. These generally include a storage medium or media having instructions stored thereon used to program a computer to perform the methods described above. Examples of suitable storage medium or media include any type of disk including floppy disks, optical disks, DVDs, CD ROMs, magnetic optical disks, RAMs, EPROMs, EEPROMs, magnetic or optical cards, hard disk, flash card, smart card, and other media.

Stored on one or more of the computer readable media, the program includes software for controlling both the hardware of a general purpose or specialized computer or microprocessor. This software also enables the computer or microprocessor to interact with a human or other mechanism utilizing the results of exemplary embodiments of the invention. Such software includes, but is not limited to, device drivers, operating systems and user applications. Preferably, such computer readable media further include software for performing the methods described above.

In certain other embodiments, a program for performing an exemplary method of the invention or an aspect thereof is situated on a carrier wave such as an electronic signal transferred over a data network. Suitable networks include the Internet, a frame relay network, an ATM network, a wide area network (WAN), or a local area network (LAN). Those skilled in the art will recognize that merely transferring the program over the network, rather than executing the program on a computer system or other device, does not avoid the scope of the invention.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. A method for identifying a document for sharing with a recipient, in a data processing apparatus, the method comprising:
   providing a plurality of reference documents, each reference document having reference data stored in a memory;
   receiving from a handheld device, document data associated with one of the reference documents, wherein the document data comprises actual data from the document;
   extracting at least a portion of the received document data as scanning data;
   retrieving the reference data from the memory;
   comparing the scanning data with the reference data; and
   selecting, when the scanning data matches at least a portion of the reference data of one of the reference documents, the one reference document as the identified document.

2. The method of claim 1 wherein the scanning data extracted from the received document data includes digital text data identifying a name of the one reference document.

3. The method of claim 1 wherein the scanning data extracted from the received document data includes digital test data identifying an author of the one reference document.

4. The method of claim 1 wherein the scanning data extracted from the received document data includes digital text data identifying a publication date of the one reference document.

5. A method for identifying a document and sharing the identified document with a recipient, in a data processing apparatus, the data processing apparatus coupled to a data network, the method comprising:
   providing a plurality of reference documents, each reference document having associated reference data scored in a memory;
   receiving, from a handheld device in communication with the data processing apparatus, information captured from a source document by the handheld device, wherein the information comprises actual data from the source document, and address information identifying a receiving address for the recipient;
   extracting at least a portion of the captured information as scanning data;
   retrieving the scanning data from the memory;
   comparing the scanning data with the reference data;
   selecting, when the scanning data matches at least a portion of the reference data associated with one of the reference documents, the one reference document as the identified document; and
   sending, using the address information, the selected document to the receiving address of the recipient.

6. The method of claim 5 wherein the scanning data extracted from the received document data includes digital text data identifying a name of the source document.

7. The method of claim 5 wherein the scanning data extracted from the received document data include digital text data identifying an author of the source document.

8. The method of claim 5 wherein the scanning data extracted from the received document data includes digital text data identifying a publication date of the source document.

9. The method of claim 5 wherein sending the selected document includes:
   attaching the selected document to an e-mail message, and
   sending the e-mail message to the receiving address via the data network.

10. The method of claim 5 wherein sending the selected document includes:
    sending the selected document to the receiving address via facsimile transmission.

11. A method for sharing with a recipient a document having information using a handheld device having a memory a capable of communicating with a data processing apparatus in communication with a data network, the method comprising:
    capturing the information from the document using the handheld device, wherein the information comprises actual data from the document;
    storing the captured in formation in the memory of the handheld device;
    providing, to the handheld device, address information identifying a receiving address for the recipient;
    storing, in the memory of the handheld device, the address information;
    establishing a communications path between the handheld device and the data processing apparatus;
    sending the captured information and the address information from the handheld device to the data processing apparatus via the communications path;
    receiving, by the data processing apparatus, the captured information as scanning data; information from the handheld device;
    extracting at least a portion of the captured information as scanning data;
    providing a plurality of reference documents, each reference document having reference data stored in a reference memory;
    retrieving the reference data from the reference memory;
    comparing the scanning data with the reference data;
    selecting, when the scanning data matches at least a portion of the reference data of one of the reference document, the one reference document as the identified document; and
    sending, using the address information, the selected document to the receiving address of the recipient.

12. The method of claim 11 wherein the document is an electronic document.

13. The method of claim 11 wherein the document is a physical document.

14. The method of claim 13 wherein the physical document is a periodical article.

15. The method of claim 13 wherein the physical document is a newspaper article.

16. The method of claim 13 wherein the physical document is a magazine article.

17. The method of claim 11 wherein capturing the information includes:
    scanning the document to generate scanned information, and converting the scanned information to digital text data; and wherein storing the captured information includes storing the digital text data.

18. The method of claim 11 wherein captured the information includes:

providing, the information as spoken audio, and converting the spoken audio to a digital audio signal; and wherein storing the captured information includes storing the digital audio signal.

19. A data processing apparatus for identifying one of a plurality of reference documents for sharing with a recipient in communication with a data network each reference document having reference data, from information received from a handheld device in communication with the data processing apparatus, the data processing apparatus coupled to the data network, the apparatus comprising:

a memory in which a plurality of instructions are stored; and a processor coupled to the memory and coupled to: (i) access the reference data in a storage medium, and (ii) receive the information from the handheld device, wherein the information comprises actual data from a document, the processor capable of executing the instructions in the memory, execution of the instructions causing a plurality of steps to be performed including:

extracting at least a portion of the information received from the handheld device as scanning data, comparing the scanning data with the reference data, and selecting, when the scanning data matches at least a portion of the reference data of one of the reference documents, the one reference document as the identified document.

20. The data processing apparatus of claim 19, wherein the execution of the instructions by the processor causes further steps to be performed, namely:

establishing a communications path between the data processing apparatus and the recipient via the data network, and sending using the address information, the selected document to the receiving address of the recipient via the communications path.

21. The data processing apparatus of claim 20 wherein sending the selected document includes:

attaching the selected document to an e-mail message, and sending the e-mail message to the receiving address via the data network.

22. The data processing apparatus of claim 20 wherein sending the selected document includes:

sending the selectee document to the receiving address via facsimile transmission.

23. A system for identifying one of a plurality of reference documents, each reference document having associated reference data, for sharing the identified document with a recipient, the system comprising:

a data processing apparatus in communication with a data network; and a handheld device having a memory and capable of;

capturing the information from the document, wherein the information comprises actual data from the document, storing the captured information in the memory, storing, in the memory, address information identifying a receiving address for the recipient, establishing a communications path with the data processing apparatus, and sending the captured information and the address information from the handheld device to the data processing apparatus via, the communications path;

the data processing apparatus capable of:

receiving the captured information and the address in information from the handheld device, extracting at least a portion of the captured information its scanning data, accessing the reference data, comparing the scanning data with the reference data, selecting, when the scanning data matches at least a portion of the reference data associated with one of the reference documents, the one reference document as the identified document, establishing a communications path between the data processing apparatus and the recipient via the data network, and sending, using the address information, the selected document to the receiving address of the recipient via the communications path.

24. The system of claim 23 wherein the handheld device is a cellular phone.

25. The system of claim 23 wherein the handheld device is a personal digital assistant ("PDA").

26. The system of claim 23 wherein the handheld device is a watch.

27. A processor readable storage medium having processor readable program code such that when executed by a processor in a data processing apparatus, performs a method for identifying one of a plurality of reference documents for sharing with a recipient, each reference document having reference data, from information received by the data processing apparatus from a handheld device in communication with the data processing apparatus, the method comprising:

extracting at least a portion of the information received from the handheld device as scanning data, wherein the information comprises actual data from a document;

extracting at least a portion of the information received from the handheld device as address information identifying a receiving address for the recipient;

comparing the scanning data with the reference data;

selecting, when the scanning data matches at least a portion of the reference data of one of the reference documents, the one reference document as the identified document; and sending, using the address information, the selected document to the receiving address of the recipient.

28. The processor readable storage medium of claim 27 wherein the scanning data extracted from the received document data includes digital text data identifying a name of the one reference document.

29. The processor readable storage medium of claim 27 wherein the scanning data extracted from the received document data includes digital text data identifying an author of the one reference document.

30. The processor readable storage medium of claim 27 wherein the scanning data extracted from the received document data includes digital text data identifying a publication date of the one reference document.

31. A method, comprising:

providing a plurality of reference items, each reference item having associated reference data stored in a memory;

receiving, form a handheld device in communication with the data processing apparatus, information captured from an item by the handheld device, wherein the information comprises actual data from the item, and address information identifying a receiving address for the recipient;

extracting at last a portion of the captured information as scanning data;

comparing the scanning data with the reference data;

selecting, when the scanning data matches at least a portion of the reference data associated with one of the reference items, the one reference item as the identified item; and sending, using the address information, the identified item to the receiving address of the recipient.

32. A method, comprising:

providing a plurality of reference documents, each reference document having associated reference data stored in a memory;

receiving, from a handheld device in communication with the data processing apparatus, information captured from a document by the handheld device, wherein the information comprises actual data from the document;

extraction at least a portion of the captured information as scanning data;

comparing the scanning data with the reference data; and selecting, when the scanning data matches at least a portion of the reference data associated with one of the reference documents, the one reference document as the identified document.

33. A method, comprising:

providing a plurality of reference items, each reference item having associated reference data stored in a memory;

receiving, from a handheld device in communication with the data processing apparatus, information captured from an item by the handheld device, wherein the information comprises actual data from the item;

extracting at least a portion of the captured information as scanning data;

comparing the scanning data with the reference data; and selecting, when the scanning data matches at least a portion of the reference data associated with one or the reference items, the one reference item as the identified item.

34. The method of claim 1 wherein the scanning data extracted from the received document data includes digital text data identifying a name of a publication in which the one reference document appears.

35. The method of claim 5 wherein the scanning data extracted from the received document data includes digital text data identifying a name of a publication in which the source document appears.

36. The method of claim 27 wherein the scanning data extracted from the received document data includes digital text data identifying a name of a publication in which the one reference document appears.

* * * * *